United States Patent [19]
Macho et al.

[11] 3,918,733
[45] Nov. 11, 1975

[54] ARTICULATED APPLIANCE DOLLY

[75] Inventors: Jan M. Macho, La Canada; Richard O. Oxford, Los Angeles, both of Calif.

[73] Assignee: Dial Industries, Inc., Los Angeles, Calif.

[22] Filed: Sept. 23, 1974

[21] Appl. No.: 508,461

[52] U.S. Cl. .................................. 280/35; 280/79.1
[51] Int. Cl.² ........................................ B62D 21/14
[58] Field of Search .......... 280/79.1, 79.2, 35, 34 R; 16/20, 46, 48

[56] References Cited
UNITED STATES PATENTS

| | | | |
|---|---|---|---|
| 2,949,823 | 8/1960 | Ross | 280/79.1 |
| 3,430,973 | 3/1969 | Vartanian | 280/35 |

*Primary Examiner*—Robert R. Song
*Attorney, Agent, or Firm*—Robert R. Thornton

[57] ABSTRACT

An articulated appliance dolly consisting of a wheeled load platform rigidly connected to a second load platform borne by a steerable truck, two of which articulated appliance dollies are employed for steerably translating heavy appliances.

2 Claims, 5 Drawing Figures

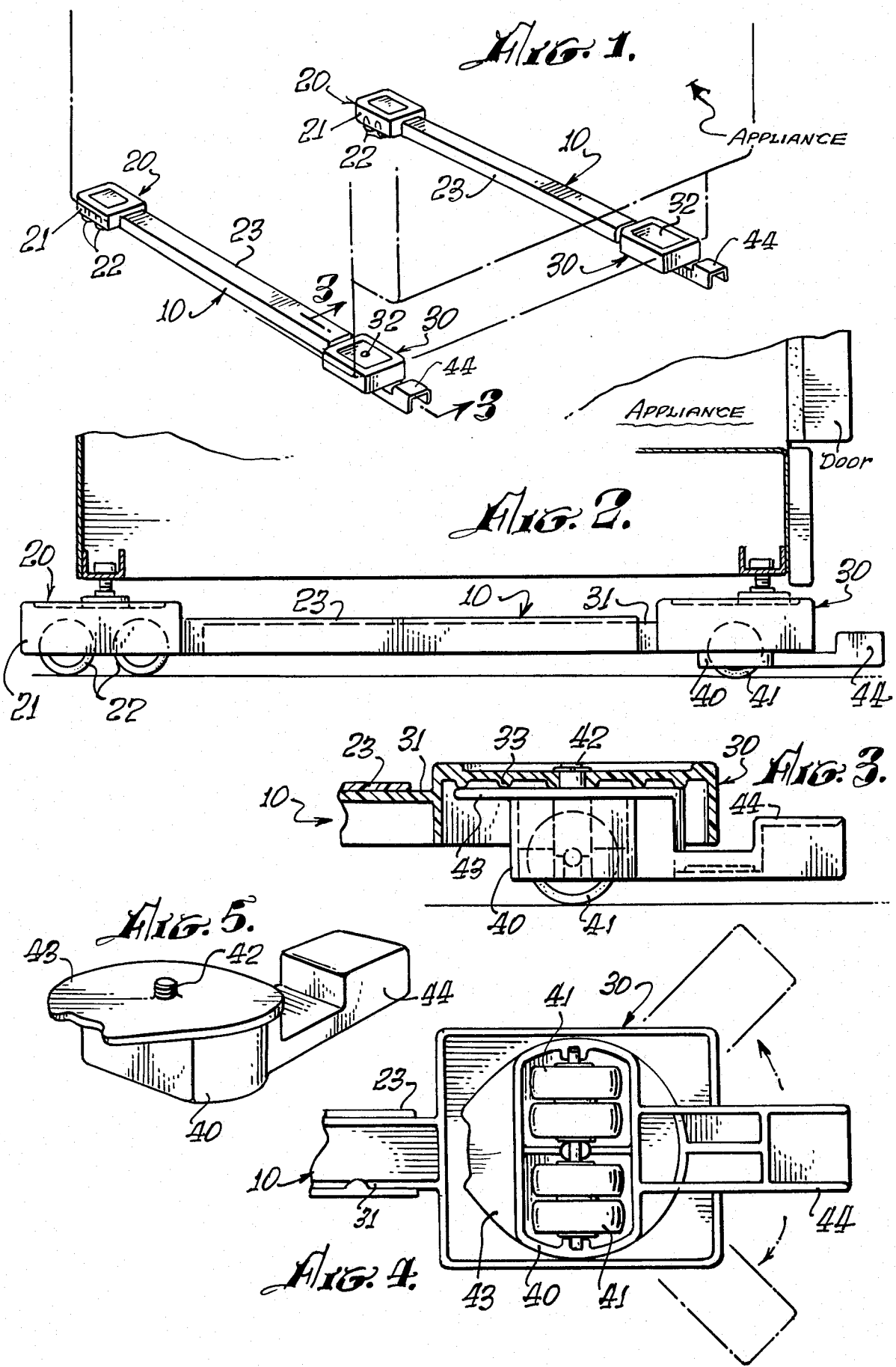

ARTICULATED APPLIANCE DOLLY

BACKGROUND OF THE INVENTION

1. Field of the Invention

This invention relates to an improved appliance dolly and more particularly to an appliance dolly for steerably translating heavy appliances.

2. Description of the Prior Art

It is known in the art to provide for translation of heavy appliances by the use of rigidly connected, wheeled load platforms. Typically, two such appliance dollies are used for such applications as moving refrigerators which typically have four load-bearing legs; one appliance dolly being placed under the left legs and the other being placed under the right legs of the appliance. The difficulty common to such prior art appliance dollies is that the wheels or tires are all rigidly mounted in parallel planes of rotation and movement of the appliance within a confined space, such as a culdesac, can be extremely difficult.

It is one of the principal objects of this invention to provide an appliance dolly which is steerable. A second object of the invention is to provide the capability of steering said appliance dolly without sacrificing the advantage of a multiple-tired truck for bearing heavy loads with minimal damage to floor surfaces.

SUMMARY OF THE INVENTION

According to the present invention, an articulated appliance dolly for steerably translating heavy appliances is provided with a wheeled truck in a horizontally rotable relationship with one of two load platforms. The two load platforms are preferably connected by telescoping shafts which permit an adjustment of the distance between the two platforms according to the size of the appliance to be moved. Two or more wheels or tires are fitted to a carriage supporting the first load platform, and two or more wheels or tires are fitted to the truck supporting the second load platform. The underside of the second load platform forms a bearing surface which rides the substantially horizontal bearing plate of the truck. Concentric circular ribs may be used either on the bearing surface or the bearing plate in order to minimize the area of frictional contact between the bearing surface and the bearing plate. The truck is provided with a tongue or some other means by which the truck may be rotated and the dolly steered.

The invention may be understood more readily by reference to the accompanying drawing, which illustrates the articulated appliance dolly and its operation according to the present invention. In the drawing, various parts are designated by reference to characters.

FIG. 1 is a perspective view showing the use of two articulated appliance dollies to support a large appliance, such as a refrigerator or freezer, having four bearing points.

FIG. 2 is a side elevation showing the application of two bearing legs of a large appliance to the two load platforms of the articulated appliance dolly.

FIG. 3 is a cut-away drawing showing the details of the second load platform and its supporting wheeled truck.

FIG. 4 is a perspective view of the body of the truck, showing the bearing plate, vertical axle, and tongue.

FIG. 5 is a bottom view of the second load platform and truck, showing three possible positions of the truck.

DESCRIPTION OF THE PREFERRED EMBODIMENT

The preferred form of the articulated appliance dolly 10 is illustrated in the accompanying drawings. A first load platform 20 is supported by a carriage 21 which rides two or more wheels or tires 22 rigidly mounted to the carriage 21 in parallel plane of rotation. A second load platform 30 is preferably connected with the first platform by means of telescoping shafts 23 and 31, so that the distance between the two load platforms may be adjusted according to the size of the appliance to be moved. In FIG. 2, carriage 21 is fitted with a female shaft 23 which telescopes with male shaft 31 fitted to the second load platform 30. The second load platform 30 is supported by a truck 40 having two or more wheels or tires 41 rigidly mounted to the truck in parallel planes of rotation. Truck 40 is fitted with a vertical axle 42 which is rotable within hole 32 of the second load platform 30. The underside of the second load platform 30 forms a bearing surface supported by bearing surface 43 of truck 40. As shown in FIG. 3, the bearing surface of the second load platform consists of circular ribs 33 concentric about hole 32 which reduce the friction which would otherwise exist in the absence of such ribs. It is preferred that ribs 33 and bearing surface 43 by composed of materials having low surface friction properties, such as plastic or teflon. It will be understood that any means of securing truck 40 and load platform 30 in a horizontally rotable relationship may be used.

A tongue 44 extends from truck 40 to permit the operator to rotate truck 40 and thus steer the dolly. Wheels or tires 41 are preferably spherical in configuration in order to permit ease of rotation of the truck.

In normal operation, the interplay of ribs 33 and bearing surface 43 establishes a load-leveling function, and the appliance weight is transmitted efficiently to the wheels. One of the advantages of the invention is that several wheels or tires may be used in the truck, while still maintaining the ability to rotate the truck in a horizontal plane, reducing the unit loading for each truck and thereby lessening the chance for damages to floors.

The inventors wish it to be understood that the foregoing description of the preferred embodiment of the invention, and the accompanying drawings are provided for purposes of illustration and are not intended to limit the invention to the specific embodiment described and illustrated.

The invention claimed is:

1. An appliance dolly of the type having a first horizontal load platform supported by a wheeled carriage adjustably spaced from a second horizontal load platform in combination with:

a truck having wheels rotably mounted to said truck, means interconnecting said second load platform and said truck member for permitting relative rotation about a transverse axis said means including complimentary bearing surfaces consisting of a substantially horizontal surface on the lower side of said second load platform and one or more circular ribs concentric about said transverse axis on the upper surface of said truck.

2. An appliance dolly of the type having a first horizontal load platform supported by a wheeled carriage adjustably spaced from a second horizontal load platform in combination with:
- a truck having wheels rotably mounted to said truck,
- means interconnecting said second load platform and said truck member for permitting relative rotation about a transverse axis said means including complimentary bearing surfaces consisting of one or more circular ribs concentric about said transverse axis on the lower surface of said second platform with the upper surface of said truck consisting of substantially horizontal surface.

* * * * *